United States Patent [19]

Uyeda

[11] Patent Number: 4,579,337
[45] Date of Patent: Apr. 1, 1986

[54] EXERCISE DEVICE

[75] Inventor: Tim M. Uyeda, S. San Gabriel, Calif.

[73] Assignee: Marcy Gymnasium Equipment Co., Alhambra, Calif.

[21] Appl. No.: 564,383

[22] Filed: Dec. 22, 1983

[51] Int. Cl.[4] .............................................. A63B 13/00
[52] U.S. Cl. .................................... 272/123; 403/259
[58] Field of Search .............. 272/122, 123, 117, 116, 272/124; 403/259, 261, 118, 343; 285/298, 303

[56] References Cited

U.S. PATENT DOCUMENTS

| | | | |
|---|---|---|---|
| 2,640,696 | 6/1953 | Lemieux | 272/123 |
| 2,796,269 | 6/1957 | Watson | 272/123 X |
| 3,351,363 | 11/1967 | Downey et al. | 285/303 |
| 3,413,022 | 11/1968 | Waddell | 403/261 |

FOREIGN PATENT DOCUMENTS 2419221 10/1975 Fed. Rep. of Germany ...... 272/123

Primary Examiner—Richard J. Apley
Assistant Examiner—Robert W. Bahr
Attorney, Agent, or Firm—James E. Brunton

[57] ABSTRACT

A barbell-like exercise device having an elongated bar of the type adapted to carry interchangeable weights. The bar is provided with grooved end portions and spaced apart radially enlarged protuberances against which the weights are held by clamping collars. The clamping collars include threadably interconnected cylindrical members which carry radially movable locking members which are adapted to be brought into locking engagement with the grooves in the bar upon relative rotation of the cylindrical members.

8 Claims, 4 Drawing Figures

EXERCISE DEVICE

BACKGROUND OF THE INVENTION

1. Field of the Invention

The present invention relates generally to exercising apparatus and more particularly to a weight lifting device including an elongated exercise bar of the type having interchangeable weights and embodying a specially designed safety locking collar for positively and securely locking the weights in position of the lifting bar.

2. Background of the Invention

Lifting bars carrying interchangeable weights have been used for physical conditioning for many years. Typically, these devices comprise an elongated cylindrical bar and a plurality of interchangeable, centrally apertured weights which are positioned at either end of the bar. Numerous types of locking collars have been suggested for use in holding the weights in position on the bar. However, the most commonly used locking collar comprises a cylindrical sleeve which is closely receivable over the ends of the lifting bar and includes a set screw carried within a radially extending, internally threaded bore formed in the sleeve. Usually the weights are sandwiched between two locking collars and the set screws on each collar are tightened down against the lifting bar to hold the weights in position.

While variations in locking collar designs exist, most such prior art devices have a common failing, namely the tendency of the locking collar to loosen during the exercise workout. When this occurs the trainee and those about him are placed in substantial danger. If the locking collar becomes loose thereby permitting the heavy weights to slide off the end of the bar, the falling weights can cause serious injury to the trainee as well as to those in the area.

A primary objective of the present invention is to prevent injury of the character described by providing an exercise device wherein the weights are securely and positively locked in place on the lifting bar and can be removed only by positive manipulation of the uniquely designed locking mechanisms of the invention.

SUMMARY OF THE INVENTION

It is an object of the present invention to provide an exercise device of the type having an elongate lifting bar and interchangeable weights in which the weights are positively and safely positioned on the lifting bar and cannot become accidentally separated therefrom.

It is another object of the invention to provide a device of the aforementioned character in which the weights are held in constant pressural engagement with bosses provided proximate the ends of the lifting bar by novel locking collars which can quickly and easily be removed from the bar without the use of any tools.

Another object of the invention is to provide a device of the character described in which the locking collars can be repeatedly moved into and out of locking engagement with the weights without causing damage to either the weights or to the lifting bar.

Still another object of the invention is to provide a device as previously described in which the unique design of the locking collars is such that when moved into a locking position they simultaneously exert a tightening pressure against the weights and against the lifting bar.

A further object of the invention is to provide a device as described in the preceding paragraphs which is highly reliable in use, is inexpensive to manufacture, and is virtually indestructable.

DESCRIPTION OF ONE FORM OF THE INVENTION

Figure 1:
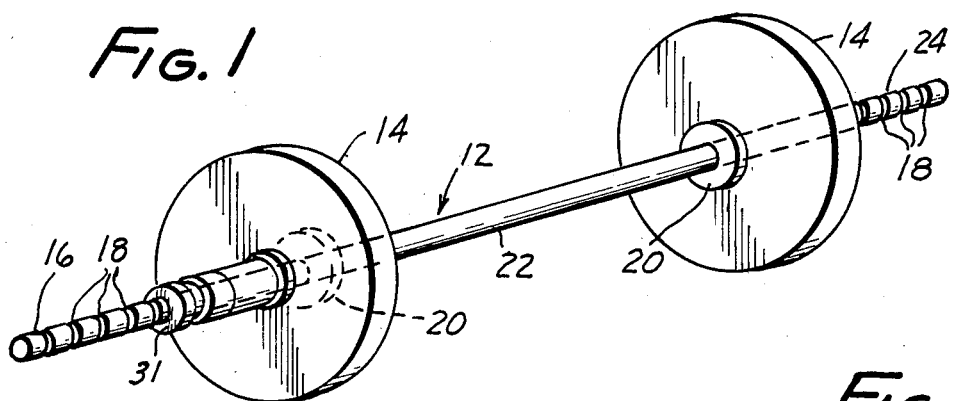
FIG. 1 is a generally perspective view of the exercising device of the present invention.
Figure 2:
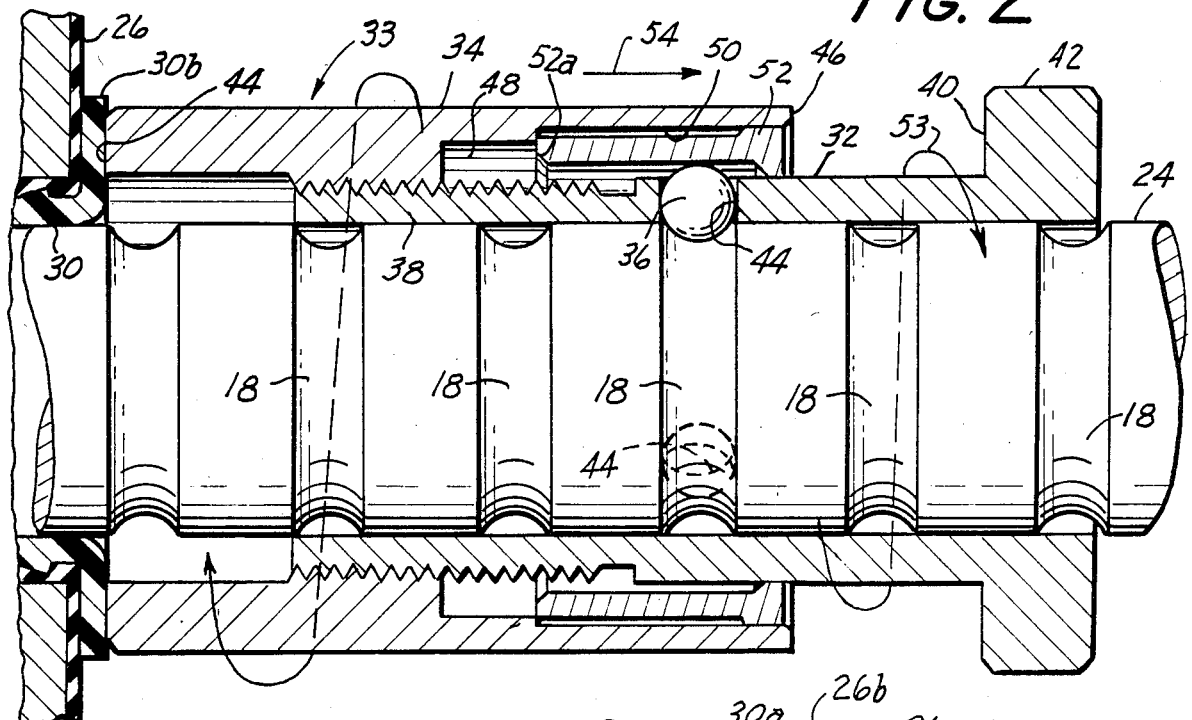
FIG. 2 is a greatly enlarged, cross-sectional view of one of the end portions of the device shown in FIG. 1, illustrating the internal construction of the locking collar means of the invention for securely positioning replaceable weights on the lifting bar.
Figure 3:
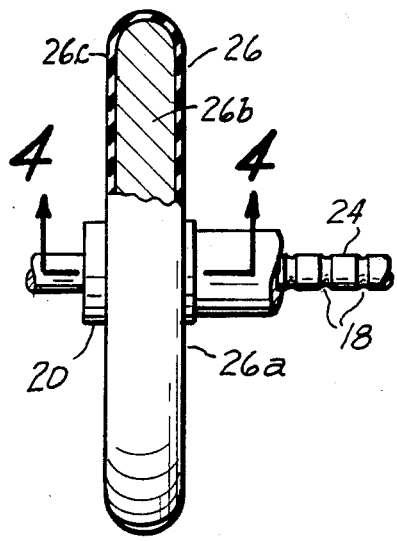
FIG. 3 is a fragmentary side elevational view of one of the end portions of the device shown in FIG. 1 with the replaceable weight being broken away to illustrate its construction.

Referring to the drawings, and particularly to FIGS. 1, 2 and 3 thereof, the exercising device of the present invention comprises an elongated substantially cylindrically shaped bar 12 adapted to carry interchangeable weight assemblies 14. As best seen by referring to FIG. 1, bar 12 has a first end portion 16 provided with a plurality of longitudinally spaced apart, circumferentially extending grooves 18, first and second longitudinally spaced apart weight locating means, shown here as radially enlarged, integrally formed protuberances 20, and a central portion 22 disposed intermediate protuberances 20. The second, or opposite end portion of the bar 24 is similar to first end portion 16 also having a plurality of longitudinally spaced apart, circumferentially extending grooves 18.

Figure 4:
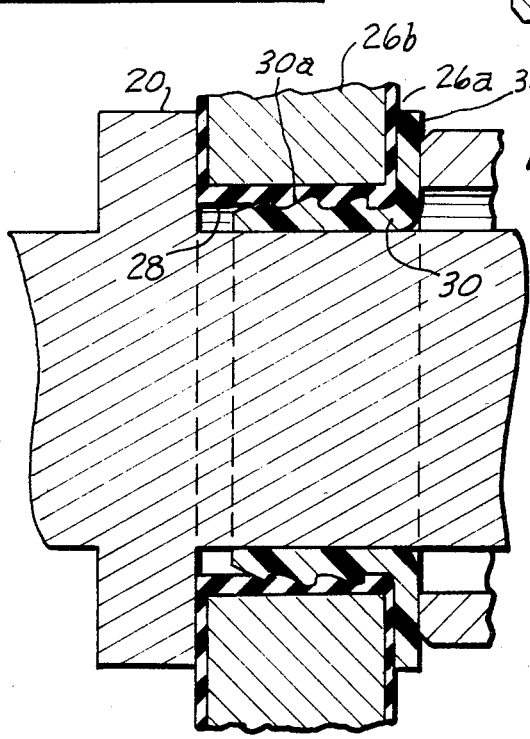
FIG. 4 is a greatly enlarged fragmentary cross-sectional view taken along lines 4—4 of FIG. 3 illustrating the construction of plastic weight inserts receivable within the centrally apertured weights of the device.

As best seen by also referring to FIG. 4, the weight means, or weight assemblies of the present invention comprise a disk shaped weight 26 having a generally centrally disposed aperture 28 adapted to closely receive end portions 16 and 24 of the bar 12. In the form of the invention shown in the drawings, the weight assemblies also include a plastic sleeve insert 30 which is closely receivable within aperture 28 and functions to permit the weight assemblies to slide smoothly over the bar. This plastic insert 30 is provided with an external sawtooth-like surface 30a which is adapted to grip the interior surface of aperture 28 in a manner to prevent accidental separation of sleeve 30 from the weight assembly 14. Additionally, sleeves 30 are provided with a flange portion 30b which engages the surface 26a of the weight 26 when the sleeve is in position within aperture 28. In the form of the invention shown in the drawings, each of the weights 26 comprises a center core 26b, which may be of any dense material such as iron, and a protective covering 26c which may be a hard rubber or suitable plastic material which encapsulates the center core.

At the heart of the device of the present invention are clamping means carried by the first and second end portions of bar 12 for maintaining the apertured weight means in secure engagement with the locating means, or protuberances 20. In the form of the invention shown in FIG. 2, these clamping means comprise first and second identically constructed locking collar assemblies 31 and 33. Each of the collar assemblies has a first cylindrical member 32, a second cylindrical member 34 adapted to be threadably interconnected with member 32, and locking means movable into engagement with the grooves 18 provided on the end portions of bar 12. In a manner presently to be described, the locking means function to lock the collar assemblies against longitudinal movement relative to the end portions of the lifting bar.

Referring particularly to FIG. 2, first cylindrical member 32 has first and second end portions 38 and 40. First end portion 38 is externally threaded while second end portion 40 terminates in a radially enlarged flange 42. Disposed intermediate the first and second ends of cylindrical member 32 are three radially extending bores 44 which are equally spaced apart by approximately 120° and which extend through the side walls of the member 32. Bores 44 are adpated to carry the locking means, which are provided here in the form of spherical members 36. The size and configuration of bores 44 are such as to permit radial movement of members 36 from a first retracted position into the second locking position shown in FIG. 2 where members 36 are in engagement with one of the grooves 18 formed in the end portions of the lifting bar.

Second cylindrical member 34 is internally threaded and has first and second ends 44 and 46. First end 44 is adapted to engage flange portion 30b of sleeve 30 when the assembly is moved into a locking position. Second end portion 46 is counter bored to define first and second contiguous chambers 48 and 50. First chamber 48 is adapted to receive the locking members 36 when these members are in the first retracted position.

Receivable within second chamber 50 is actuating means shown here in the form of an insert member 52. This member is provided with a tapered end portion 52a which, upon rotation of member 32, is adapted to engage the locking members 36 so as to move them from a first retracted position wherein they are received within chamber 48 into the second locking position as shown in FIG. 2.

In operating the exercising device of the invention, with the locking collar assemblies removed from the lifting bar, the weight assemblies 14 are emplaced over either end of the bar and are moved toward the center of the bar to a position wherein the inboard surfaces of the weight assemblies are in engagement with the bosses or protuberances 20. Each of the locking collar assemblies is then emplaced over the end portions of the bar and moved into engagement with the outer surfaces of the weight assemblies. It is to be observed that, when the locking collar assemblies are in a configuration which allows them to be emplaced over the end portions of the bar, cylindrical member 32 is threaded into cylindrical member 34 to a position wherein flange 42 is in engagement with end 46 of member 34. In this position the spherical members 36 are in alignment with chamber 48. Accordingly, they are free to move radially outwardly within bores 44 and into chamber 48 to a position wherein the inner surfaces of the spherical members are in alignment with the inner surface of cylindrical member 32. With the spherical members in this position, the locking collar assembly can freely move back and forth over the end portions of the lifting bar.

With the locking collar assembly positioned against the weight assembly, rotational movement of member 32 relative to member 34 in the direction shown by the arrows 53 in FIG. 2, will cause member 32 to move outwardly in the direction shown by the arrow 54. This outward movement of member 32 (to the right as viewed in FIG. 2) will cause spherical members 36 to move into engagement with tapered surface 52a on insert 52. This tapered surface will cause the spherical members 36 to move radially inwardly with respect to bores 44. As these members move inwardly they will seat within one of the grooves 18 formed in the end portions of the lifting bar. Continued rotational movement of part 32 relative to part 34 will cause part 34 to move in a direction toward the weight assemblies, or to the left as viewed in FIG. 2. This movement will cause end 44 of cylindrical member 34 to pressurally engage the weight assembly tending to urge it securely against protuberance 20. At the same time, this relative rotational movement between parts 32 and 34 will cause the locking members 36 to seat securely in pressural engagement against the rounded bottom surface of the circumferentially extending groove 18 in which the members are seated. The greater the force exerted to move members 32 and 34 rotationally with respect to one another, the greater will be the force tending to urge the weight assembly against the protuberance 20 and the greater will be the force tending to seat the locking members 36 securely within the groove 18.

With the arrangement described in the preceding paragraphs, it is obvious that the collars cannot accidentally loosen and separate from the end portions of the bar. In order to remove the collars, and thereby remove the weight assemblies, it is necessary that a positive rotational force be exerted on each collar tending to rotate members 32 and 34 relative to one another in a direction which will cause member 34 to move away from the weight assemblies to a location wherein the locking members 44 can be received within chamber 48. Then, and only then, can locking members 36 move radially outwardly into chamber 48 and out of groove 18 so as to permit the locking collar assembly to be removed from the end portion of the bar.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:
1. An exercising device comprising:
 (a) an elongated bar, including axially spaced apart locating means defining a central portion therebetween and first and second end portions axially outwardly thereof, each of said end portions having at least one circumferentially extending groove formed therein;
 (b) at least one apertured weight means adapted to be slidably received over each of said first and second end portions; and
 (c) first and second clamping means carried by said first and second end portions of said bar for maintaining said apertured weight means in pressural engagement with said locating means, each of said clamping means comprising:
  (i) a first, cylindrical member having first and second end portions, said first end portion being externally threaded, said member having at least one radially extending bore therethrough disposed intermediate said first and second end portions;

(ii) a locking member radially movable within said bore from a first position wherein said locking member is spaced from said groove in said bar toward a second position wherein said locking member exerts a radially inwardly directed pressure on said bar, said locking member being adapted to lockably engage said groove formed in said end portions of said bar when said locking member is in said second position whereby said locking member is locked against axial movement along said bar in a direction away from said weight means;

(iii) a second, internally threaded cylindrical member adapted to be threadably interconnected with said first member, said member having first and second ends, said first end being adapted to move into pressural engagement with said weight means when said locking member is in said second position and upon rotation of said first cylindrical member relative to said second cylindrical member in a first direction tending to separate said members and said second end being counter-bored to define first and second contiguous chambers, said first chamber being adapted to receive said locking member when said member is in said first position; and (iv) actuating means within said second chamber of said second member for moving said locking member continuously radially inwardly from said first position toward said second position upon rotational movement of said first cylindrical member relative to said second cylindrical member in a first direction whereby continued rotational movement of said first cylindrical member relative to second cylindrical member in said first direction will simultaneously result in increasing pressural engagement of said locking member against said bar and increasing pressural engagement of said first end of said second member against said weight means.

2. An exercising apparatus as defined in claim 1 in which said weight means comprises centrally apertured disk shaped weights including sleeve means receivable within said central aperture for guiding the sliding travel of said weights over said end portions of said bar.

3. An exercising apparatus as defined in claim 1 in which said locating means comprise radially enlarged protuberances integrally formed with said elongated bar.

4. An exercising apparatus as defined in claim 1 in which said first cylindrical member is provided with three circumferentially spaced radially extending bores.

5. An exercise apparatus as defined in claim 4 in which said circumferentially extending grooves have rounded bottoms and in which said locking members are generally spherical in shape.

6. An exercising device comprising:
(a) an elongated substantially cylindrically shaped bar having a first end portion provided with a plurality of longitudinally spaced apart circumferentially extending grooves, first and second longitudinally spaced apart, radially englarged protuberances, a central portion disposed intermediate said protuberances and a second end portion provided with a plurality of longitudinally spaced apart circumferentially extending grooves;

(b) at least two weight assemblies adapted to be carried on said first and second end portions of said bar, each said weight assembly comprising a disc shaped weight having a generally centrally disposed aperture adapted to receive said end portions of said bar;

(c) first and second locking collar assemblies carried by said first and second end portions of said bar, each of said assembly comprising:
(i) a first, cylindrical member having first and second end portions, said first end portion being externally threaded said member further including a plurality of radially extending bores disposed intermediate said first and second end portions;

(ii) at least one generally spherically shaped locking members radially movable within said bores from a first position wherein said locking member is out of pressural engagement with said bar toward a second position wherein said locking member exerts an increasing radially inwardly directed pressure on said bar, said locking members being adapted to lockably engage one of said grooves formed in said end portions of said bar when said locking members are in said second position whereby said locking members are locked against axial movement along said bar in a direction away from said weight assemblies;

(iii) a second, internally threaded cylindrical member adapted to be threadably interconnected with said first member, said member having first and second ends, said first end being adapted to pressurally engage one of said weight assemblies when said locking members are in said second position and upon rotation of said first cylindrical member relative to said second cylindrical member in a first direction tending to separate said members and said second end portion being counter-bored to define first and second contiguous chambers, said first chamber being adapted to receive said locking members when said members are in said first position; and (iv) an insert receivable within said second chamber of said second member, said insert having a tapered end portion adapted to engage said locking members for moving said members from said first position toward said second position upon rotational movement of said first cylindrical member relative to said second cylindrical member in a first direction whereby continued rotational movement of said first cylindrical member in said first direction will result in increasing pressure being exerted by said locking members on said bar and simultaneously will result in increasing pressure being exerted by said second member against said weight assemblies.

7. An exercising apparatus as defined in claim 6 in which said first cylindrical member is provided with three radially extending bores circumferentially spaced apart by approximately 120°.

8. An exercising apparatus as defined in claim 6 in which said weight assemblies each comprise a plastic sleeve insert having an internal diameter slightly larger than the external diameter of said bar.

* * * * *